Figures 1, 2:
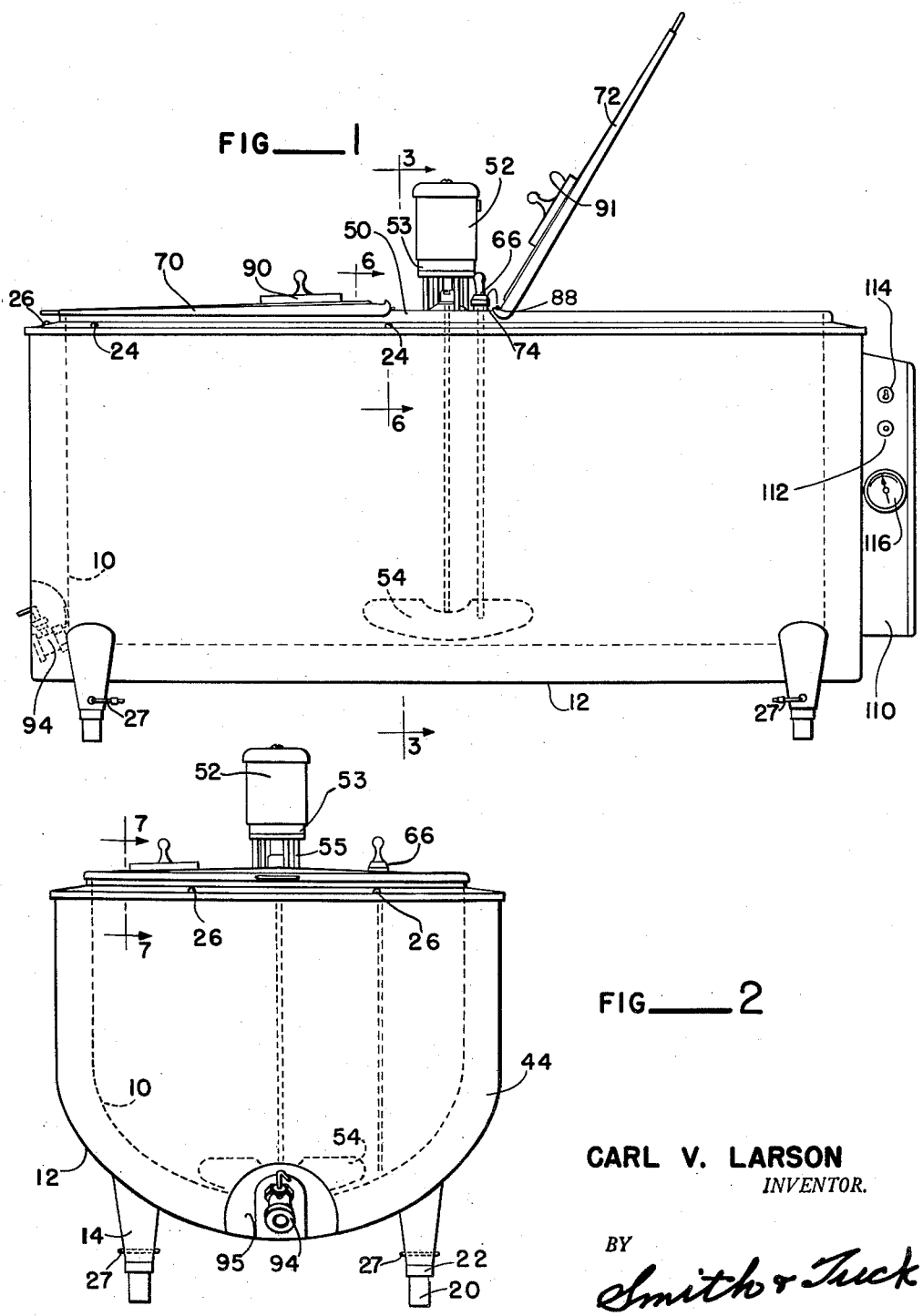

Jan. 30, 1962　　　C. V. LARSON　　　3,018,915
BULK MILK TANK

Filed May 27, 1957　　　　　　　　　　　　7 Sheets-Sheet 1

CARL V. LARSON
*INVENTOR.*

BY
*Smith & Tuck*

Jan. 30, 1962     C. V. LARSON     3,018,915
BULK MILK TANK
Filed May 27, 1957                                                    7 Sheets-Sheet 2
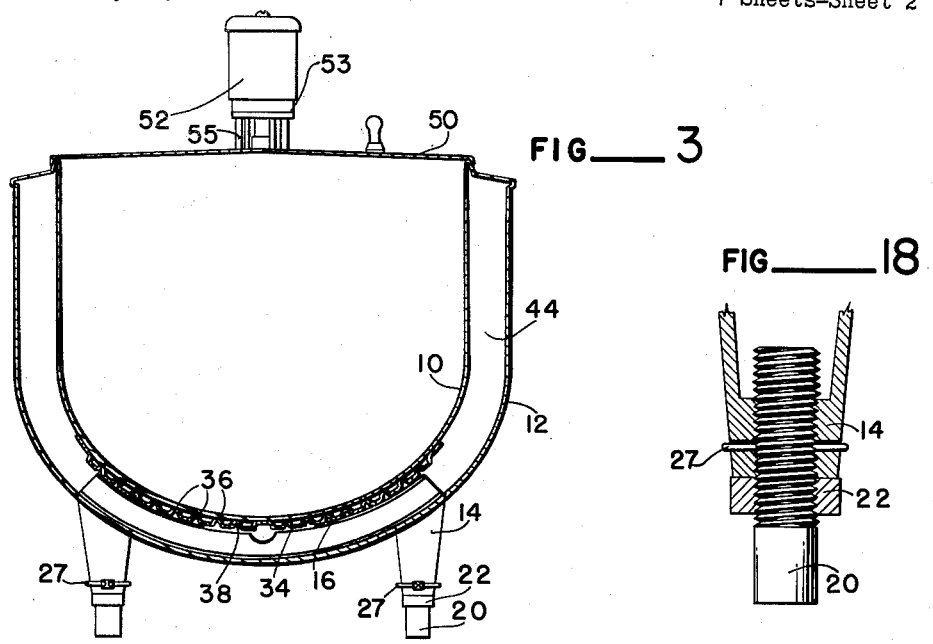
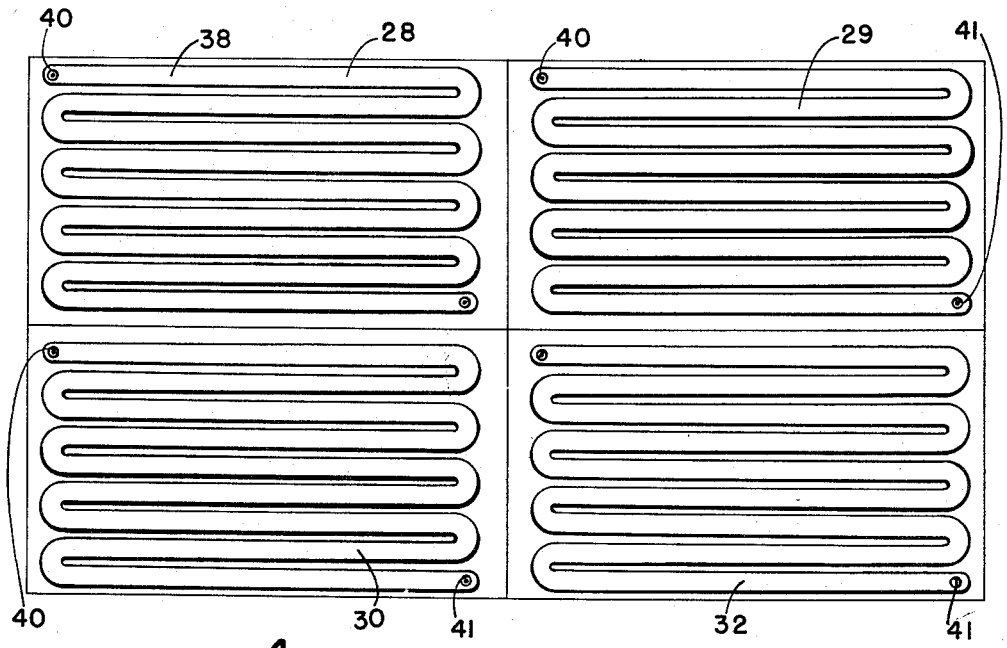
CARL V. LARSON
*INVENTOR.*
BY
*Smith & Tuck*

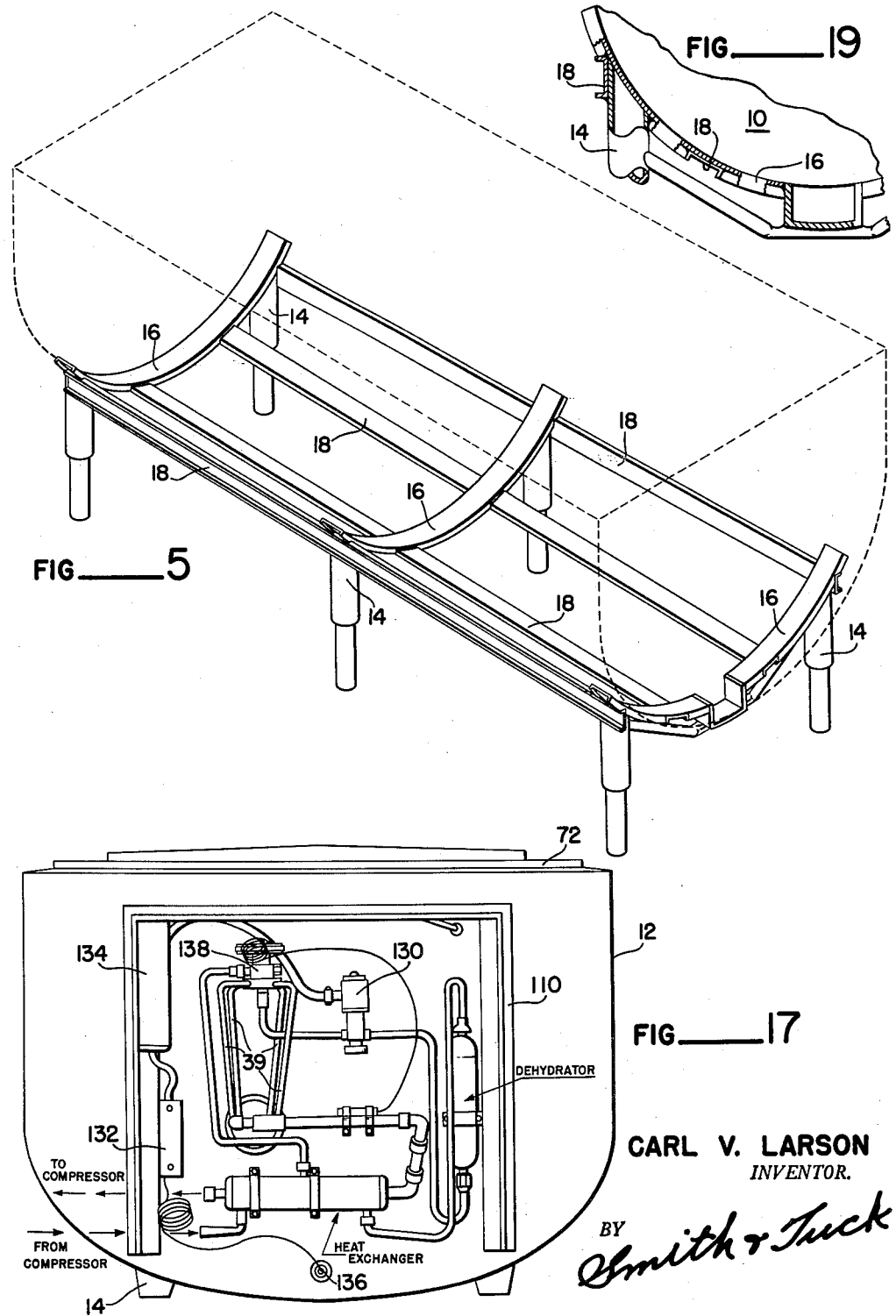

Jan. 30, 1962     C. V. LARSON     3,018,915
BULK MILK TANK
Filed May 27, 1957     7 Sheets-Sheet 4
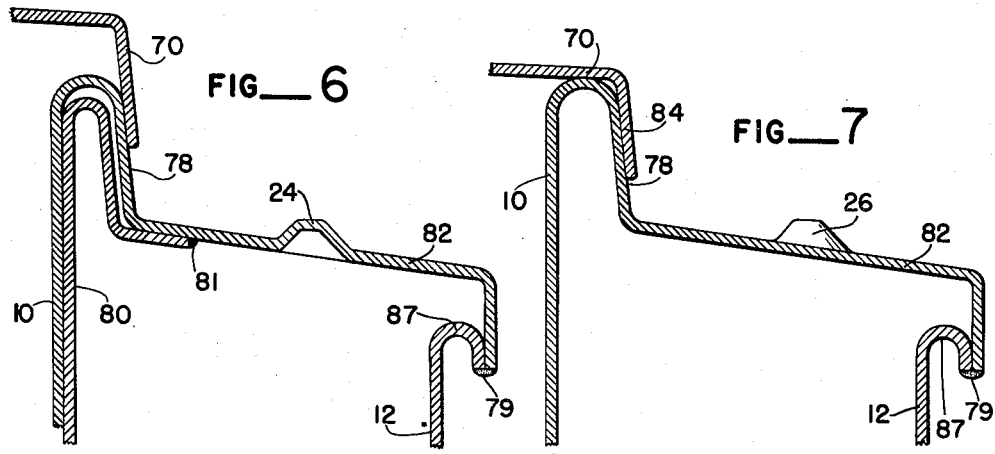
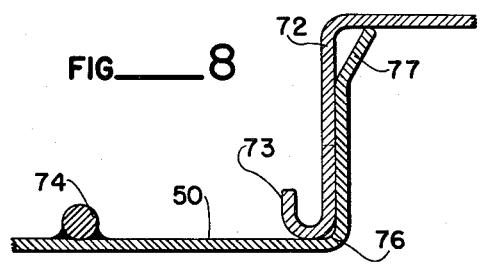
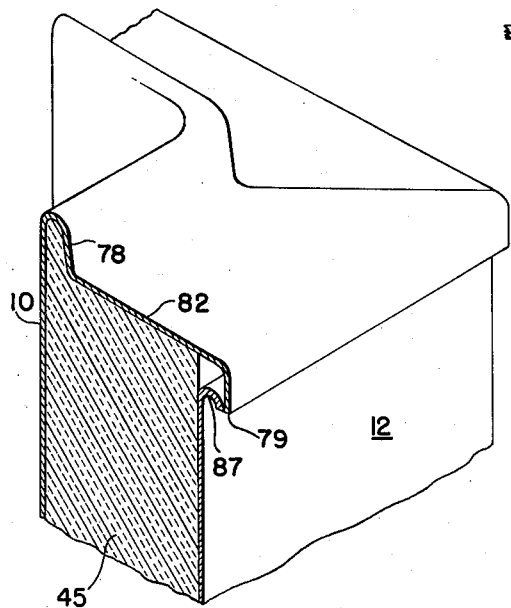
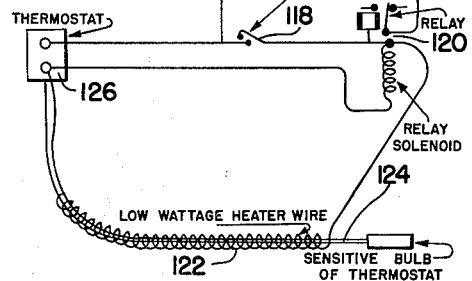
*INVENTOR.*
CARL V. LARSON
BY

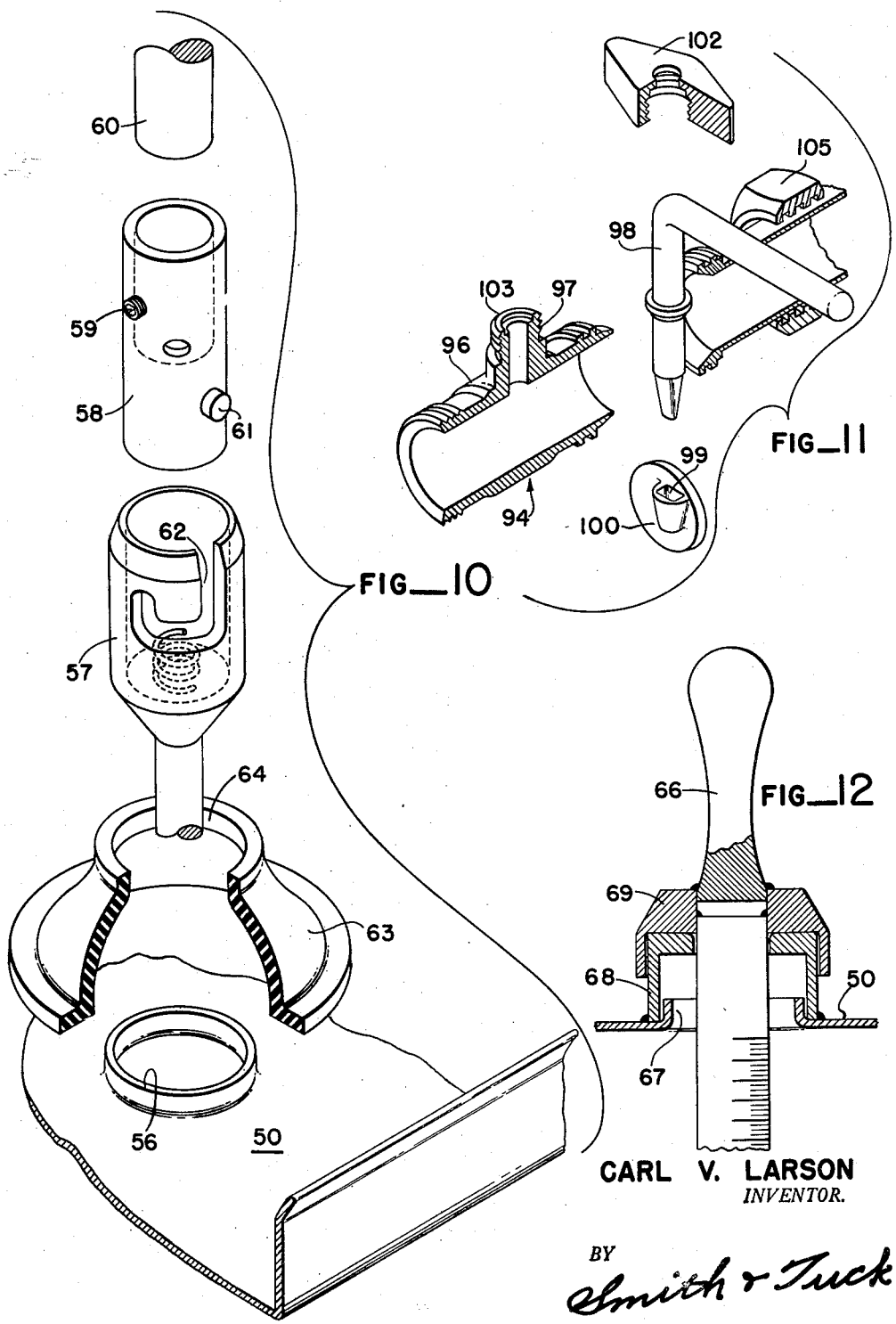

Jan. 30, 1962  C. V. LARSON  3,018,915
BULK MILK TANK
Filed May 27, 1957  7 Sheets-Sheet 6
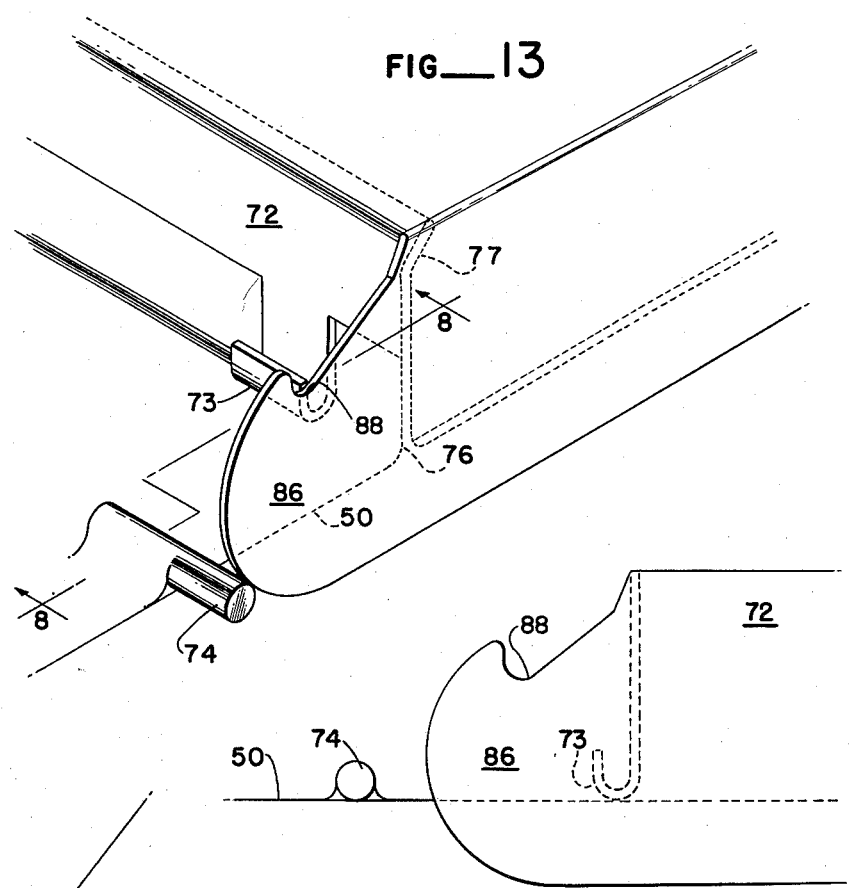
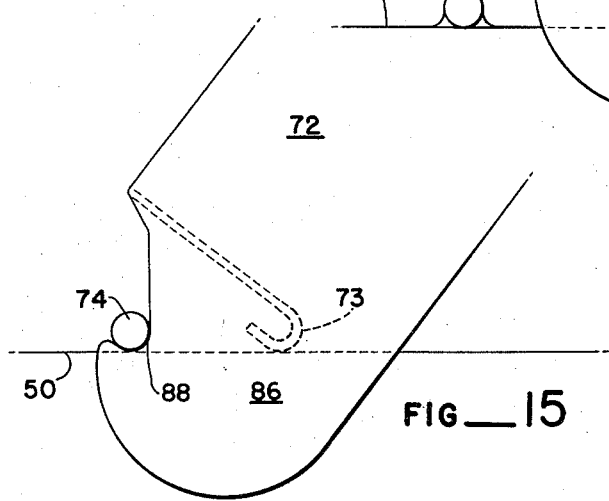
CARL V. LARSON
*INVENTOR.*
BY
*Smith & Tuck*

Jan. 30, 1962     C. V. LARSON     3,018,915
BULK MILK TANK

Filed May 27, 1957     7 Sheets-Sheet 7

CARL V. LARSON
*INVENTOR.*

BY *Smith & Tuck*

United States Patent Office 3,018,915
Patented Jan. 30, 1962

3,018,915
BULK MILK TANK
Carl V. Larson, St. Paul, Minn., assignor to Sunset Equipment Co., St. Paul, Minn., a corporation of Minnesota
Filed May 27, 1957, Ser. No. 661,785
2 Claims. (Cl. 220—15)

This present invention relates to the general art of refrigerated liquid-holding tanks, and more particularly to a bulk milk tank of the type employed to hold milk from the time it is produced until it is delivered to a carrier for distribution or other processing. This present design is characterized by being formed entirely of non-corrosive materials and is finished with a satin smooth finish inside and out, so that it is easy to clean and, of course, easy to keep clean. Special means are provided to insure the uniform cooling of the contents of the tank. Arrangements are employed to insure that all closures are so constructed as to exclude all airborne contamination or insects. Special attention is given to the provision of adequate means to insure that calibration, as to the volume of the tank at different levels, will be uniform throughout the useful life of the tank.

There are many liquids which require the maintaining of definite temperatures, especially in the lower range, so as to guard against bacteria action and the like. An outstanding food product that has always been a perplexing problem is fresh milk. Normally there are two milkings each day, in the dairy, and the milk must be held until it can be delivered to the milk-processing or distribution agency. Many different forms of milk coolers have been made available, and this present invention is an improved form of the milk cooler shown in my Patent No. 2,672,323. My present invention meets all the requirements for the standard specifications of milk-holding tanks as now in force in the various subdivisions of the United States. In order to comply with these specifications and to produce an article of commerce that will meet with ready acceptance by the buying agencies, it has been necessary to combine a large number of elements, to the end that a bulk tank can be provided that will meet all the technical standards set. It is essential that the tank be relatively easy to keep in a highly sanitary condition which will, inside and outside, reflect the cleanliness that this tank, on the one hand, provides and, on the other hand, impresses upon the minds of those persons who come in contact with it.

The principal object of this present invention is to provide a bulk milk tank that will meet the specifications of the various standards set up for this type of equipment.

A further object of this invention is to provide a bulk milk tank that can be readily maintained in a clean condition.

A further object of this invention is to provide for the rigid supporting of the tank, to the end that, once it is properly installed, it will maintain the form and level of the tank so that, once calibrated, the tank will retain this calibration throughout its life.

A further object of this invention is to provide a bulk milk tank in which the cooling means is so broken down into unit panels as to thoroughly equalize the applied low temperatures of the refrigerant.

A further object of this invention is to provide a simplified form of agitating means, to the end that the temperature of the entire mass of milk in a relatively large holding tank will be uniform throughout the mass.

A further object of this invention is to provide a method of initiating compressor operation by providing for manual switching-in of a momentary circuit controlling a relay which in turn switches a low wattage heating element into the thermostat control means, so that the compressor can be accommodating itself to the increased load that is to be applied to it.

Further objects, advantages and capabilities will be apparent from the description and disclosure in the drawings, or may be comprehended or are inherent in the device.

Figure 20:
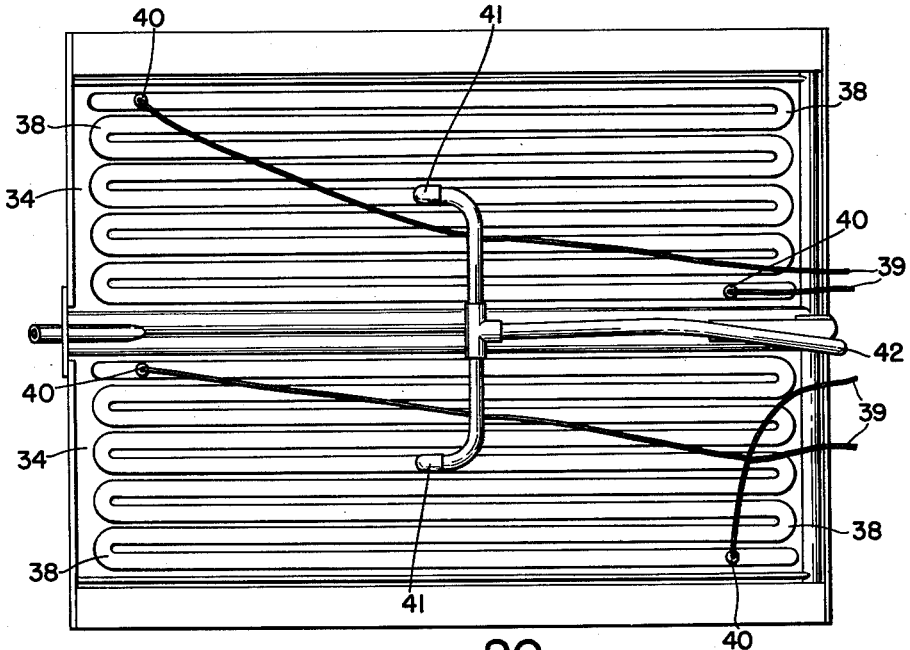
Figure 21:
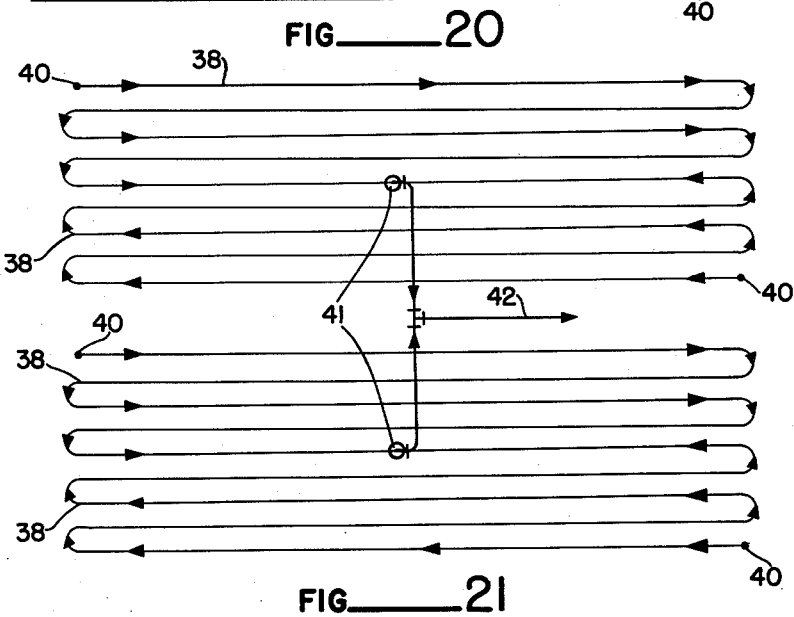

In the drawings:
FIGURE 1 is a side elevation of a preferred form of my bulk milk tank.
FIGURE 2 is an end view taken from the discharge end of the tank in FIGURE 1.
FIGURE 3 is a cross-sectional view taken along the line 3—3 of FIGURE 1.
FIGURE 4 is an illustrative view showing the four separate cooling panels and the manner in which the cooling fluid is circulated through the same.
FIGURE 5 is a perspective view illustrating a preferred form of supporting saddles and longitudinal frame members for supporting the bottom of my tank.
FIGURE 6 is a cross-sectional view showing the upper portion of the housing and covering arrangement, taken along the line 6—6 of FIGURE 1.
FIGURE 7 is a fragmentary cross-sectional view taken along the line 7—7 of FIGURE 2.
FIGURE 8 is a fragmentary cross-sectional view taken along the line 8—8 of FIGURE 13.
FIGURE 9 illustrates a typical upper corner construction, partly in section, employed in my tank.
FIGURE 10 is an exploded view showing the various parts of the bayonet connecting means for coupling the motor drive to the agitator shaft.
FIGURE 11 is an exploded perspective view illustrating the discharge opening of the tank and showing the elements of the valve used in this structure.
FIGURE 12 is a fragmentary cross-sectional view illustrating the upper end of the measuring or dip stick and the opening for the same in the cover of the tank, together with the means employed to shield the same against the entry of foreign material or insects into the tank.
FIGURE 13 is a fragmentary perspective view illustrating a typical corner hinge assembly as employed on the top cover members of this tank.
FIGURE 14 is a side elevation of a cover member in its closed position.
FIGURE 15 is a diagrammatic view similar to FIGURE 14, but illustrating the cover in its open position.
FIGURE 16 is a diagrammatic view illustrating the low wattage heating wire and associated parts used to trigger the thermostat and thus switch on the compressor unit prior to any indicated need, as it would be shown on the thermostat in normal operation.
FIGURE 17 is an end view of the tank with the cover of the accessory housing removed and illustrating the arrangement of the circulatory and electrical and mechanical control units associated with the refrigerant circulation.
FIGURE 18 is a fragmentary, vertical sectional view illustrating the adjusting feature of the tank-supporting legs, which makes it possible to accurately level the tank.
FIGURE 19 is a fragmentary end view, in elevation and broken away and sectioned, as viewed from the end of FIGURE 5.
FIGURE 20 is a bottom plan view of a modified form of the cooling panel used in this equipment.
FIGURE 21 is a diagrammatic view illustrating the flow of refrigerant as employed in the cooling panel of the type shown in FIGURE 20.

Referring more particularly to the disclosure in the drawings, numerals 10 and 12 designate, respectively, the inner and outer shell plating of my tank. These are formed by curving them so as to produce, with the end closures, a tank that is U-shaped in cross-section and rectangular in longitudinal section. One reason for selecting this particular shape for the tank is that, in this manner, maximum rigidity is obtained from a piece of sheet metal of a given gauge thickness. It is necessary in a tank of this order to have it arranged so that it can be calibrated for volume and that this calibration can be accepted both by the farmer when he sells his milk and by the commercial dairy facility which purchases the milk. It therefore is very desirable that, once the tank is put in place and its factory calibration tested, the tank should be capable of maintaining this calibration throughout its useful life. It therefore becomes very necessary that the tank be adequately supported, and a desirable form of support is that indicated in FIGURE 5. FIGURE 5 differs from the showing of FIGURE 1 only in that a longer tank is shown, and this calls for extra intermediate legs, making six in all in this particular size tank. Each pair of legs 14 is provided with a saddle member shown at 16. This saddle member is normally made of an appropriate structural shape that is curved to fit almost the entire bottom of the interior milk-confining shell 10. The various saddles 16, of which three are indicated in FIGURE 5, are interconnected by reinforcing longitudinal members 18. The number of these members will be a function of the size of the tank and how much otherwise unsupported area must be given support to prevent deformation under load.

Each of the various legs 14 is provided with a threaded lower member as 20 and a lock nut 22, so that the machine can be very carefully leveled. In order to facilitate the leveling of the tank, raised seat members as 24 are provided on one side of the tank, and similar raised seat members 26 are provided on one end of the tank, preferably the discharge end, so that a spirit level may be seated on these members and insure an indexing so that the leveling of the tank can be achieved with accuracy. As soon as the tank is leveled, the locking nuts 22 are tightened, preferably with a special tool adapted to engage a round surface so as to discourage any tampering with the level, it being evident, it is believed, that any attempt to unscrew the locking nuts would leave normally the toothed impressions made by a pipe wrench. When the facilities permit, the leg 14 and foot member 20 may be drilled after adjustment is secured and a lead seal 27 put in place.

It will be noted from FIGURE 1 that the legs 14 are set inwardly from each end of the tank so that the supporting value of the legs and the connecting framework of the saddle member 16 and the longitudinals 18 will engage the inner liner 10 in a manner to best support it, as very little supporting value can be assessed to the outer shell 12 because of the spacing involved.

Additional supporting of the inside shell 10 is provided across the bottom of the same by an improved form of cooling panels, shown in FIGURES 3 and 4. In this arrangement a plurality of cooling panels as 28, 29, 30 and 32 are used. Considering the general proportions shown in FIGURES 1 and 2, four of these panels normally will be employed. In a longer unit, as indicated in FIGURE 5, it may be desirable to employ six of these panels; and in very short, small capacity tanks two of the same may be sufficient. These panels are best employed as a cooperative unit and are die-impressed to produce the outer enclosure members as 34; and the inwardly directed bends which define the pipes or fluid passages, as will be noted in FIGURE 4, are preferably electrowelded as at 36 to the outside of tank liner 10. This arrangement provides very intimate contact of the refrigerant circulating through the various passageways 38 and, as the refrigerant is separated from the milk by only one thickness of normally stainless steel shell 10, a very efficient heat transfer is provided and the refrigeration cycle is a very efficient one. This welded-in second bottom, because of the unusual strength of the passageway-forming plate 34, which in effect is just a sequence of channels, gives maximum rigidity to the load-carrying bottom of inner shell 10. These panels, as 28 through 32, contribute to the support required between the various arcuate supporting members 16, to the end that there will be no sagging of the bottom of the tank structure throughout the life of the unit. This is a very important factor and one that mitigates to the universal satisfaction that this equipment has given in the field. It is to be noted that each of the panel members, as 28, 29, 30 and 32, is provided with circulatory connections as 40 and 41. This arrangement adds materially to the uniform cooling of the tank, as will be brought out when the circulatory system is explained later in this specification.

In FIGURES 20 and 21 is illustrated a unit form of cooling panel wherein two juxtapositioned panels are employed, but which are joined together on one of their long sides and becomes in effect a single unit. This thought is carried out further by having a common suction line 42 for the refrigerant and which branches to connect with the center of each panel section. As previously noted, four separate refrigerant supply lines 39 are provided. These lines are used in pairs to feed the ends of the two single built-up tubes 38, each of which is supplied with a centrally connected suction line. FIGURE 21 has been included to illustrate the refrigerant flow through the cooling unit, with the direction of flow indicated by arrow heads.

As this bulk milk tank is designed to maintain milk or other liquids at a relatively low temperature, it is very desirable that the space between shells 10 and 12, as the space 44, be filled with a suitable insulating material 45, as indicated in FIGURE 9 particularly. This insulating material is carried, of course, up to the upper margins of plates 10 and 12, but no attempt is made to insulate the top closures themselves. Long experience with open storage for frozen foods and the like in "serve-yourself" stores has indicated that there is very little loss by having even an open top, as is common in most such stores. However, in the case of a milk container, it is very important that a very secure closure be had for the top, but not necessarily of an insulating type.

In equipment of this order the top closures become quite important, and two considerations are involved in the final design and construction of the cover members. First is the consideration that the covers must fit well and exclude airborne dust and other contaminants and insects. Secondly, the equipment must convey a clean appearance; it must be easy to clean; and it must be easy to keep the equipment clean. Otherwise the labor element would defeat, in part, the purpose of this equipment. The cover arrangements are best illustrated in FIGURES 1–3, 6–9 and 13–15. A preferred construction is to employ a fixed central or bridge portion 50. This member can be given sufficient strength and reinforcement so that it provides a very effective central tie member which gives the tank adequate strength at the central portion of the same, so as to resist outward deflection. Any outward deflection of the center of the tank walls would immediately, and very positively, upset all volume calibration. A further advantage of the central bridge member is that it provides an anchor for the motor 52 and its drive means leading down to the agitator blade 54. It has been found most practical to have the motor 52 and its associated reduction gearing 53 disposed well above the bridge, as on a plurality of studs 55 so that, on one hand, it is possible to isolate the motor and any lubrication drip therefrom; and, secondly, it provides space so that a detachable shaft connection can be provided for the agitator. This arrangement is best shown in FIGURE 10, in which an opening 56 is provided in bridge 50, and this should be large enough to pass the bulbous portion of bayonet slot member 57. Adapted to engage in the bayonet housing member 57 is a coupling member 58 which in turn is fixedly secured, as by a set screw 59, to the motor drive shaft 60. The operation of the coupling member, with its exterior detent 61, and the bayonet slot 62 will be apparent, it is believed. In order to seal opening 56 a resilient, molded type of bulbous gasket is provided at 63. The upper opening of this member as 64 is of a diameter to provide close operational fit for the bottom portion of the bulbous connector 57.

The bridge 50 also provides an admission port and anchoring means for the dip stick member 66. This construction is more fully illustrated in FIGURE 12, in which it will be noted that the dip stick proper 66 has a graduated portion which may be calibrated for the particular tank to show gallons, pounds or any other measurement desired. As before, a relatively generous opening is provided at 67, and this is provided in turn with an upstanding cap as 68 which preferably is welded to the plating of deck 50. Formed as part of the dip stick, or as a separate piece welded thereto, is the female member or cap 69 which fits over the cap 68 in a manner to exclude all possible entry of moisture, dust, vermin and the like from the tank.

Disposed on each side of bridge 50 are similar covers, which complete the protection of the milk-holding compartment. These covers are preferably not fixedly hinged to the tank, but rather are disposed so that they will have overlapping turned-down margins which are sloping or beveled and engage similarly beveled surfaces, formed on the upper margin of the tank, so that they will be accurately centered or positioned and at the same time come down to a thorough closure position. In FIGURE 1 covers 70 and 72 are indicated. These covers, when raised, pivot upon a return-bend portion 73 and, if it is desired to have the same held open, after the showing of cover 72 in FIGURE 1, the notch 88 formed in the extended cam member 86 is engaged under rod 74, which extends out beyond the edge where the cover slopes downwardly from the line established by the inner shell 10 to the outer shell 12. In order to provide a seal for the hinging end of covers 70 and 72, reference is made to FIGURE 8 in which a portion of the deck member 50 is bent upwardly at 76 and terminates in a beveled portion 77, which aids in easy centering and engagement of the covers and additionally forms in effect a double seal for this portion of the cover, one being provided by the upper end of member 77, where it abuts the cover, and the other where the turned-down flange engages wall 76 of the deck member.

A study of FIGURES 6 and 7 will indicate the preferred form of construction for the top margin of the tank walls. FIGURE 6 is a typical view through one of the sides, in which it will be noted that a cover, as 70, has a beveled portion which engages the sloping wall 78. This wall 78 is formed of a portion of the interior shell 10 which is brought up around a return bend and then downwardly providing a returned leg and then out to the outer margin of the tank. At that point it is normally welded at 79 to the outer shell 12. To stiffen the relatively narrow marginal rim, which is made of relatively lightweight material, an interior welded-in reinforcement is provided at 80. This may be welded at its margins, as indicated at 81, and serves to give added stiffness to the upper margin of liner 10. This extra welded-in stiffening piece, in addition to strengthening the narrow rim, also forms part of the marginal assembly, including particularly the more or less flat run 82 of the interior liner 10, and this in turn, with the structure shown adjacent the weld 79, provides a structural shape that has great resistance to distortion, and this is a very important feature, in that it prevents the side walls giving outwardly under load between where it is held at each end and at the center bridge member 50. This construction, therefore, is a very desirable one, in that it insures the retention of the calibration of the tank.

In FIGURE 7 a typical section through the ends of the tank is illustrated. Here the cover 70 has a downwardly extending sloping lip as 84, which engages a sloping head as 78, and then the similar, substantially horizontal portion 82, which flows into the structure shown at 79. This construction, then carries out the showing through FIGURES 6 and 9, in that it provides a means for centering and sealing the covers 70 and 72, and it also gives a structural form that resists distortion and prevents the end walls of the tank from being bulged outwardly at its otherwise unsupported upper margin.

Attention is invited to the showing at 87 in FIGURES 6, 7 and 9, wherein the outer housing wall 12 is formed with a return bend, and then the extreme and downwardly directed end is welded to member 82 as at 79. The joint is then ground and polished smooth. This arrangement produces a very strong juncture and insures that any condensate or spilled liquids will drip off at 79 and not follow down wall 12.

In all these forms it will be noted, it is believed, that the preferably stainless steel plating is applied so that there are no sharp corners, and the arrangement lends itself so well to cleaning and is so laborsaving, in that it can be readily cleaned and easily kept clean at all times.

FIGURE 9 illustrates one of the corners and is a section comparable to that of FIGURE 7, in that it shows the end wall in section. It shows the preferred form of the insulation material, but it also illustrates the smooth flowing lines of the housing that lend themselves so well to being maintained in a clean condition.

Covers 70 and 72 are preferably provided with inspection and filling openings as 90 and 91. These openings preferably have upstanding rims that are given a bevel to engage the coacting beveled surfaces of the covers and thus position the same and insure a tight juncture.

Referring to FIGURE 2 particularly, and in part to FIGURE 1, it will be noted that a discharge valve arrangement is provided at 94. This valve is preferably seated within a recessed portion of the outer shell 12, as at 95, so that the valve itself will engage a downwardly sloping discharge tube communicating with the inner liner 10. A preferred form of this valve is illustrated in FIGURE 11, in which a housing member 96 is provided, with threaded connections on each end. The innermost of these connections engages suitable locking rings to hold the valve in secure, liquid-tight engagement with the discharge tube of the inner liner 10. A right and left hand thread on the tubes, respectively, and machined in nut 105 facilitates convenient removal of the valve assembly for thorough cleaning. A vertically extending boss as 97 is provided through which the valve handle and operating bar 98 is passed. This bar has a chisel-like end which engages a coacting recess 99 in a butterfly valve closure member 100. This valve member 100 is of a size and suitably beveled to come to a full closure position within the bore of member 96. A threaded gland nut 102 is provided to complete the assembly and engage the annular ring 103 on member 97 so as to hold the handle in its operational position at all times.

In the operation of this equipment, refrigeration fluid is normally supplied from an outside source, which is not shown in the various drawings, as this form of equipment is very well known and may take on several different forms. It is desirable to point out, however, that each of the refrigeration panels, as 28, 29, 30 and 32, should have its own separate lead 39 from the header provided in the control unit for the tank. These controls are grouped for convenience in a separate cover and housing 110. Here exteriorly are provided an electric switch 112 and an electric pushbutton 114, whose purpose will be further explained. Available exteriorly of housing 110 is the temperature gauge 116, which is operatively connected to a remote bulb which picks up the temperature of the liquid or milk in the tank.

Reference is now made to FIGURE 16, which a schematic diagram illustrates some of the working parts that experience has shown to be particularly desirable in equipment of this order.

If during the second, third or fourth milk addition, to the tank, the compressor of the refrigerator system is not in operation, a momentary switch 118 is available that the operator can close by pressing pushbutton 114. By making this momentary circuit, a relay 120 is energized that allows current to flow to a low wattage heater 122 attached to the thermostat control capillary. In about thirty to seventy seconds, sufficient heat will have been added to the control capillary 124 to cause the thermostat points to close and start agitation and cooling. When the thermostat points close, there is no voltage available to operate the heater circuit and the relay drops open. If the operator is adding milk too slowly and the blend temperature is reduced to the pre-set level of the thermostat 126, the thermostat opens and refrigeration ceases. In this event, operator can push momentary button and again start a normal cycle.

Timer motors are vulnerable to damage from electric storms. However, with this proposed method, if the heater should burn out, the accelerated on cycle feature would be gone but no freezing can occur. If the relay should stick shut and supply heat to the capillary continuously, the unit would have a tendency to short-cycle; however, during operation no heat could be supplied heater as no voltage potential exists during periods of compressor operation. The net result would be the equivalent of a narrow differential thermostat.

By adding the heater to the capillary and not overriding the thermostat, I provide the same type operation as with the relay, but will still have the thermostat in control of the overall end result.

Referring to FIGURE 17, it will be noted that a number of well known units are employed as the solenoid valve 130, the thermostat 132, the selector or control switch 134 and the sensitive thermostat sensing bulb 136. The solenoid valve 130 supplies refrigerant to the distributor or header unit 138, where the separate supply lines 39 are fed and in turn carry refrigerant separately to each of the cooling panels as 28, 29, 30 and 32. This arrangement assures uniform cooling of these units and, in turn, uniform cooling of the entire tank contents.

In considering the disclosure, it is notable that a number of elements have been included as elements of the invention and, even though some of these elements may be old, they all coact to provide the new and useful end result, which is, namely, that a bulk milk tank can be built from this specification which, it is believed, will clearly meet all the objects set out in this specification, but which obviously could not be achieved without this entire combination of elements. To be broadly stated, the end result achieved is that a bulk milk tank is provided that admits of ready cleaning; that keeps the products stored clean and at the proper temperature; that adequate controls are provided so that, with a minimum of attention, all the essential operational procedures can be easily achieved and maintained under working conditions.

It is believed that it will be clearly apparent from the above description and the disclosure in the drawings that the invention comprehends a novel construction of bulk milk tank.

Having thus disclosed the invention, I claim:

1. A bulk liquid storage tank, comprising: an insulated storage tank of U-shaped cross sectional form having an inner and an outer sheet metal shell, each having specially formed upper margins which extend entirely around said shells; a rigid supporting frame for said tank having a plurality of supporting legs disposed in pairs; each of said pairs of legs joined by a curved saddle adapted to support the bottom of said inner tank shell; the said upper margins of the inner and outer tank shell members each terminate in a return bend wherein the two walls thus formed are spaced a substantial distance apart; a substantially right angle bend provided in the inner tank shell and providing a substantially horizontal portion extending outwardly from the inner shell member; said inner and said outer tank shell members are fixedly joined together and formed to provide a vertical return bend-strengthening section and a horizontal return bend formed to provide a strengthening section and additionally to prevent distortion of the inner tank walls under varying loading.

2. A bulk milk tank of the type employing refrigeration means to cool the milk and power driven means for agitating the same, comprising: an inner U-shaped shell plating having end closure plates fixedly secured to said shell plating and providing an inner milk receiving tank; an outer U-shaped shell plating having end closure plates fixedly secured to said shell plating providing an outer tank spaced away from said inner tank to provide space for thermal insulation; a bridge transversely disposed at the longitudinal center of said tanks and fixedly joining the upper margins of the tank shells in fixed spaced relationship and joining the opposite sides of said spaced shells on opposite sides of said tanks; said U-shaped shells and said end closure plates having a top marginal assembly plating joining the top margins of said shells, said top margin plating having an upstanding return bend providing downwardly directed returned legs which are spaced apart an amount equal to several times the thickness of said shell plating, the inner U-shaped shell plating being vertically disposed and the returned leg being downwardly and outwardly directed; a substantially flat run of said top margin plating fixedly joining the upper margin of said outer U-shaped plating and thus providing a rigid box type joining of the upper margins of the U-shaped inner and outer shell plating and the upper margins of said end closure plates on each end of said tanks and covers for the open ends of said milk receiving tank pivoted to said bridge by upwardly directed sides of said bridge terminating in an inwardly bevelled portion and a downwardly directed end margin of said covers adapted to snugly engage said upwardly directed side of said bridge and terminating in a return bend portion which serve as pivots for the covers when they are opened; said covers having outwardly and downwardly flared side and end margins adapted to coact with the outwardly flared portion of said return bend portions to provide an air tight closure for said milk receiving tank.

References Cited in the file of this patent

UNITED STATES PATENTS

| | | |
|---|---|---|
| 1,891,607 | Rainey | Dec. 20, 1932 |
| 2,371,807 | Dalzell et al. | Mar. 20, 1945 |
| 2,489,652 | Lehane | Nov. 29, 1949 |
| 2,672,323 | Larson | Mar. 16, 1954 |
| 2,738,170 | Zamboni | Mar. 13, 1956 |
| 2,740,269 | Buehler | Apr. 3, 1956 |
| 2,803,952 | Setzekorn et al. | Aug. 27, 1957 |